United States Patent [19]

Zimmer

[11] Patent Number: 4,726,547

[45] Date of Patent: Feb. 23, 1988

[54] HELICOPTER WITH HIGH FORWARD SPEED

[75] Inventor: Herbert Zimmer, Friedrichshafen, Fed. Rep. of Germany

[73] Assignee: Dornier GmbH, Friesrichshafen, Fed. Rep. of Germany

[21] Appl. No.: 927,660

[22] Filed: Nov. 5, 1986

[30] Foreign Application Priority Data

Nov. 6, 1985 [DE] Fed. Rep. of Germany ....... 3539338

[51] Int. Cl.$^4$ .......................... B64C 27/82; B64C 5/02
[52] U.S. Cl. ..................................... 244/17.11; 244/6; 244/51; 244/87; 244/17.19; D 12/327; D 12/338
[58] Field of Search ............... 244/17.11; 17.19; 17.21, 244/6, 51, 7 R, 7 A, 7 B, 87; D 12/327, 338, 337; 440/37

[56] References Cited

U.S. PATENT DOCUMENTS

| | | | |
|---|---|---|---|
| D. 194,892 | 3/1963 | Harned et al. ................... | D 12/327 |
| D. 238,483 | 1/1976 | Swanson ........................ | D 12/338 |
| 1,609,978 | 12/1926 | Wagner ........................ | 244/87 |
| 2,081,957 | 6/1937 | Roche ........................ | 244/87 |
| 2,547,255 | 4/1951 | Bruel ........................ | 244/17.19 |
| 3,029,048 | 4/1962 | Brooks et al. ................... | 244/17.19 |
| 3,260,482 | 7/1966 | Stroukoff ........................ | 244/17.19 |
| 3,409,248 | 11/1968 | Bryan ........................ | 244/6 |
| 3,417,946 | 12/1968 | Hartley ........................ | 244/87 |
| 3,921,942 | 11/1975 | Bracke ........................ | 244/87 |
| 4,421,489 | 12/1983 | Veldhuizen ........................ | 440/37 |

FOREIGN PATENT DOCUMENTS

| | | | |
|---|---|---|---|
| 56121 | 9/1952 | France ........................ | 244/87 |
| 1178374 | 5/1959 | France ........................ | 244/51 |

*Primary Examiner*—Galen Barefoot
*Attorney, Agent, or Firm*—Ralf H. Siegemund

[57] ABSTRACT

A helicopter having the usual tiltable, vertical thrust and lift producing rotor, a separate forward thrust producing propeller as well as provisions for yaw control and compensation is improved in that the propeller is constructed as unshrouded propulsion device. A pair of flow deflecting rudders is arranged downstream from the propeller and symmetrically to both sides of the craft; a frame on the tail portion of the craft includes vertical shafts for pivotally mounting the rudders. A T shaped support structure in the frame includes regular elevational, horizontally extending stabilizer fins and carrier arms. An elevator is arranged upstream from the propeller and from one of the elevational stabilizer fins. The elevator reaches laterally beyond and longitudinally alongside the one fin or beyond a circle provided by the propeller.

10 Claims, 6 Drawing Figures

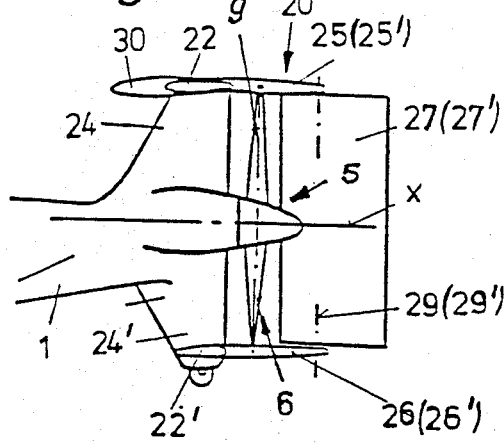
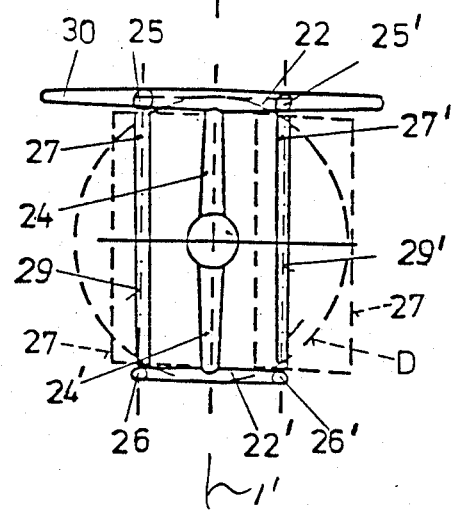
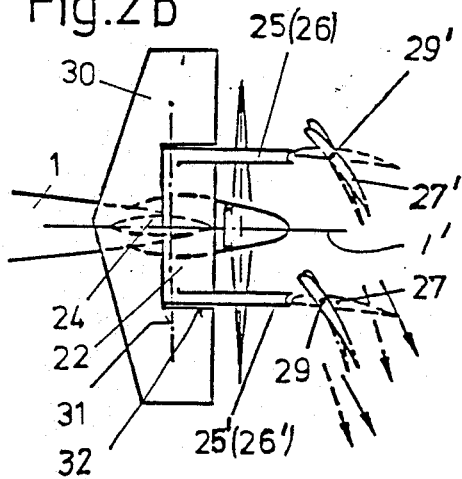
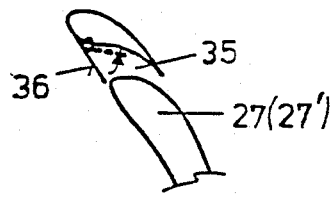
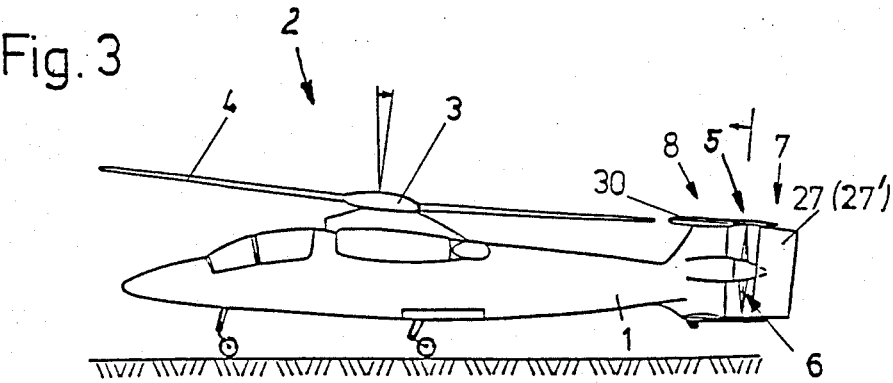

HELICOPTER WITH HIGH FORWARD SPEED

BACKGROUND OF THE INVENTION

The present invention relates to an aircraft, broadly being of the helicopter variety but to be used for crusing at a forward speed that is higher than usually deemed possible. More particularly, the invention relates to a helicopter having a main rotor producing vertical thrust (lift) and a separate propeller drive for providing forward thrust, and further including a yaw moment control and moment compensating control.

Helicopters are often constructed in that the principal rotor provides lift as well as forward thrust. The rotor, moreover, provides also the attitude control of the craft. For a moment compensation and particularly for control of an effective torque about the vertical axis, one usually provides a propeller in the rear portion of the craft whose axis of rotation is transverse to both, the direction of flight and the vertical axis. Helicopters of the type which have just been referred provide optimized hovering properties but as far as forward speed, economy, and range are concerned, they are definitely inferior as compared with normal aerodynamically operated aircraft, i.e. aircraft with aerodynamic lift producing foils (wings). The reason for this limitation in forward speed is to be seen in that for increasing forward speed, the speed of the oncoming flow with reference to that side of the craft in which the rotor blades are moving in forward direction, does approach actually the speed of sound relative to the moving blade itself so that the flow resistance of the blades increases drastically. On the other hand, on the return side of the respective rotor blades, quite often the flow tends to separate from the blade over large areas owing to its rather high angle of attack. Moreover, in the case of very high forward motion, large areas of the rotor blades are actually subject to an oncoming flow from the back.

In order to increase the range of this kind of aircraft, particularly for increasing the cruising speed, a number of different developments have occurred. For example, the so-called advancing blade concept using coaxial rotors in an attempt to provide a relatively fast flying craft. In another development, the rotors can be stopped, and still in another development, or a so-called circulation flow control is provided in that air is blown out through longitudinal slots in the rotor blades. This approach is called the X-wing concept. Also, it has been proposed to provide a rotor blade control for purposes of obtaining higher harmonic blade control with respect to the oscillation frequency provided by the rotation of the helicopter rotor. Still alternatively, rotors with controlled aerodynamic adjusting surfaces have been provided, the adjusting surfaces being arranged along the trailing edge of the rotor blade.

In order to increase the operating range of helicopter, particularly towards higher cruising speeds it is necessary to overcome the forward propagation limitation outlined above which is basically obtained whenever the return running blades experience flow separation to such an extent that they simply can no longer provide the requisite lift.

On the other hand, separate forward thrust producing engines, being separated from the principal rotor, as well as yaw controlling devices for compensating of yaw movements in helicopters, pertain to the general state of the art. In conjunction therewith it is known to provide a pressure producing propeller drive on the fuselage of a helicopter, in front of the control surface. It is also known for helicopters to provide a pivotable tail end propeller to obtain forward thrust or moment compensation, and to provide a rudder being pivotable about a vertical axis, whereby the particular effective rudder surface is arranged upstream for the respective propeller.

Helicopters of the type referred to above also are known to have a compression producing propeller being pivotable about a vertical axis and being arranged in the rear part of the craft for cooperating with the rudder. It is also known to provide tail end equipment for helicopters which include a shrouded propeller for the production of forward thrust and a rudder is disposed in the wake of that latter propeller. Also known is a deflection device for the propeller wake to cooperate with an unshrouded propeller in the tail portion of the fuselage of a helicopter, whereby the deflection device is provided with a pivotable grid of blades. The blades of the grid have a symmetrical profile and are subject to chamber control.

DESCRIPTION OF THE INVENTION

It is an object of the present invention to provide a new and improved construction for helicopters permitting a relatively high cruising speed, under particular consideration of configuring the forward thrust producing such that cooperation obtains with yaw control and yaw moment compensation with reference to the moment of the vertically thrust producing main rotor, so as to reduce aerodynamic losses and to improve economic considerations in the construction. Moreover, the inventive device should avoid the production of gyro forces which are difficult to control, and are sometimes the result of the operation of the forward thrust producing equipment. Moreover, the weight of the craft should be reduced as compared with the known construction.

In accordance with the preferred embodiment of the present invention, it is suggested to provide a tail end propeller as an unshrouded, forward propulsion and thrust producing, pusher type propeller and being associated on both sides of the vertical longitudinal center plane with air flow deflecting jet spoilerlike side rudders being effective in the wake of that tail end propeller; the flow deflecting jet spoiler rudders are pivotably mounted to a stationary carrier frame for pivoting or vertical axes, whereby this frame is at least in parts established by components pertaining to a regular rudder-elevator-stabilizer construction.

The inventive helicopter has, therefore, as a principle feature an unshrouded forward thrust producing propeller, whereby the deflecting or redirecting jet spoilerlike air foils and rudders are situated in the wake of that propeller i.e. a flow path in which higher flow speeds prevail. The flow deflecting rudders are as stated arranged symmetrically to both sides of a vertical or longitudinal center plane of the craft whereby it is no longer necessary to employ a grid network of blades which structure, as was mentioned earlier, is apt to produce significant flow losses. The jet spoilerlike deflecting rudders are disposed rather far behind the rotation of the plane of the tail end propeller and, therefore, will not interfere with the forward thrust while, on the other hand, relatively large control forces obtain. Gyro moments which are difficult to control and as they occur in pivotable propellers even unshrouded propellers, are avoided here. The flow deflecting rudders generally produce yaw control motions as well as yaw moment compensation with a fast response.

The configuration of the aforementioned carrier frame permits a disposition of the tail end propeller at an axial distance from the elevators so that also here the propeller operation is not interferred with. Moreover, the frame as proposed is constructed such that the weight of the craft is reduced owing to the utilization of elements of rudder elevator and stabilizer parts which are provided for anyway. Also, this multiple use of an arrangement constituting a frame, though not initially conceived for that purpose, ensures that the air resistance of the carrier frame is quite low. The carrier frame in accordance with the invention permits placing the elevator such that it will not interfere with either the tail end propeller and the flow deflection device. Moreover, the elevator as well as elevational stabilizing parts are basically outside the downdraft of the main rotor. This avoids unfavorable superpositioning of the main rotor wake upon any pitch control.

Owing to the configuration of the flow deflecting jet spoilerlike rudders as particular profiled high lift flaps, a moment is produced acting as counter moment to the moment produced by the principal rotor, and that counter moment is effective also in the neutral position of the jet spoilerlike rudders, which, in turn, re-inforce the forces available for directional control through these rudders.

The flow gaps of the jet spoilerlike rudders should be closable so as to avoid flow separation in case of a large deflection angle. The elevator is constructed as a balanced air foil and is arranged by means of the carrier frame outside of the wake (down draft) of the main rotor so as to avoid interference with pitch control. It is, moreover, of importance that in the case of a last forward speed almost the entire output of the power plant is used to provide forward thrust so that practically no jet flow deflection obtains. The residual moment is produced through the correspondingly adjusted flow deflecting rudders. In the case of hovering, the strongest flow deflection is necessary but the requisite power of the thrust producing plant at that point is quite low. Any residual forward thrust product during hovering on account of a deflection of the thrust that is less than 90 degrees, can be compensated through back tilting of the main rotor.

Concerning the main rotor, it operates as lift producing propeller. It is always somewhat more positively adjusted as is the case in conventional helicopters. The arrangement of the rotor propeller in conjunction with the flow deflecting rudders permits in an advantageous manner a fast deflection of the thrust vector as compared to the known arrangements by means of which the entire propeller is pivoted which leads to undesired gyro moments.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2, 2a, and 2b are respectively side, rear and bottom views of the tail end part of the craft shown in FIG. 1, showing particularly the yaw control by means of flow deflecting rudders being associated with a forward thrust producing propeller;

FIG. 2c illustrates a detail of the control surface configuration, as per FIGS. 2, 2a, and 2b; and FIG. 3 is a side elevation of the helicopter shown in FIG. 1 and in an operating state corresponding to bovering and starting phases.

Proceeding now to the detailed description of the drawings, FIGS. 1 and 3 illustrate somewhat schematically a helicopter which is composed of the following basic components. There is included a fuselage 1, a main rotor 2, which includes a rotor head 3 from which extend the rotor blades 4. These elements provide basically a vertical thrust and lift. In addition, the tail portion includes a forward propulsion and thrust producing device 6 that includes a pusher type propeller 5, a control device 7 for controlling the craft in relation to the vertical axis, (yaw control) and 8 is a pitch control structure. The rotor 2 and the propeller 5 are driven by a common power plant and engine 11 there being appropriate transmission gears to connect the plant 11 to both, the rotor 2 and the propeller 6.

Figure 1:
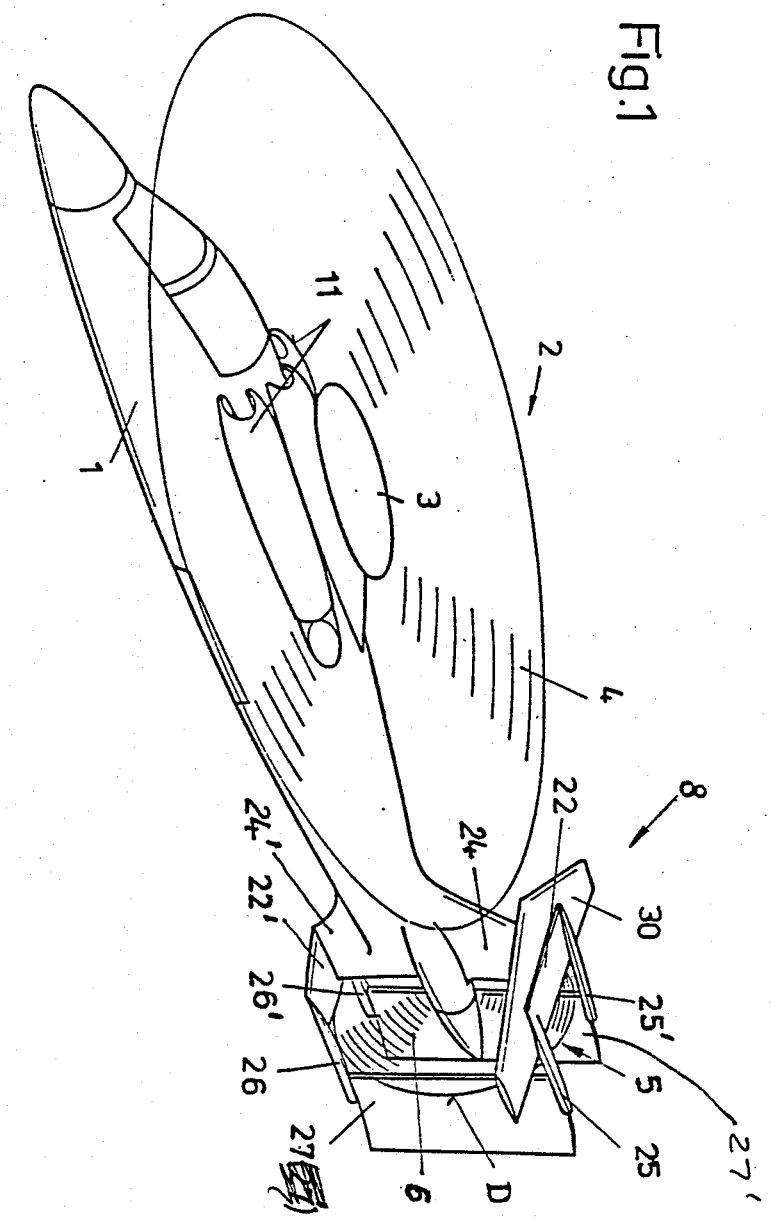
FIG. 1 is a perspective view of a helicopter improved in accordance with the preferred embodiment of the present invention for practicing the best mode thereof.

The following details concerning the tail end structure of the craft are found particularly in FIGS. 2 through 2c. They show basically that portion of the craft, which includes flow diverting jet spoilerlike side rudders 27 and 27', the yaw control 7, a pitch control 8, as well as the propeller 5, which operate in a forward thrust producing compression mode. A propeller adjusting transmission gear of generally known configuration is provided in order to adjust the blades 9 of the propeller 5. A carrier frame 20 is mounted to the rear portion of the fuselage for pivoting the flow redirecting and deflecting, jet spoilerlike rudders 27 and 27'. The frame 20 is actually composed essentially from elements which are to be provided for regular craft control and its stabilization.

The tall end equipment is provided with vertically extending stabilizing fins 24 and 24' respectively extending up and down from the tail of the fuselage 1. These lateral stabilizing fins 24, 24' carry at their respective free ends a double T arrangement that includes an upper fin, 22, and a lower horizontal stabilizing fin, 22'. Carrier rods 25 and 25' extend from the stationary part of the elevator 22 and similar rods or carriers 26 and 26' extend analogously from fin 22', whereby 25 and 26 are vertically aligned, so are 25' and 26'. As can be seen from FIG. 2a, these carriers 25,26,25' and 26' clear the propeller circle D of propeller 5. The upper and lower carriers 25 and 26 receive and hold the vertical pivot shaft 29 of the left hand deflecting rudder structure 27. Upper and lower carriers 25' and 26' analogously hold shaft 29' for pivoting the right hand deflection rudder 27'. These flow deflecting elements 27 and 27' are arranged in the wake of the propeller 5.

The carrier frame 20 is thus configured by the stabilizing fins 24 and 24'; by the elevational control and stabilizing elements 22 and 22'; by the shafts 29 and 29' and by the carriers 25,25',26,26'. The latter six elements can be regarded as additional elements; all other frame elements are per se conventional as such (though not in the particular mutual arrangement).

All of the carrier rods 25,25',26,26' are situated, as far as oncoming flow is concerned, essentially within that cross sectional area delineated by the two elevational control elements 22 and 22' so that owing to such an arrangement an increase in air resistance is avoided. The resulting carrier frame is of a construction which is stiff against twisting and will not interfere with the jet flow produced by the propeller 5. The flow directing and redirecting rudders and jet spoilerlike air foils 27 and 27' is not disturbed by this carrier frame. These two air foils 27 and 27' are arranged to both sides and in symmetric relationship to the longitudinal vertical center plane 1' of the craft. This way any cross sectional reduction and any flow losses experienced in the case of a grid of blades is avoided.

The wake of the propeller 5 is essentially undisturbed as long as the rudders and air foils 27 and 27' are in a neutral position. When deflected on one side or the other any feedback upon the propeller is minimized owing to a relatively large distance therefrom. In the particular illustrated configuration the rudders 27 and 27' remain at least to a predominant extent, within the wake of the propeller 5 even when fully deflected.

As shown specifically in FIG. 2c a flap 36 closes a gap 35 from the inside. This gap forms particularly when the airfoils 27 and 27' pivot on a vertical axis by operation of the shafts 29 and 29' which are not arranged right at one end of the profile of the respective rudder element 27 or 27'. This offset situation is visible particularly in FIGS. 2 and 2b.

The elevator 30 is constructed as a balanced rudder and is made pivotable about a horizontal axis 31. It is mounted for this purpose in the upper portion of the lateral stabilizing fin 24. The position of elevator 30 is such that it is mounted somewhat forward from the upper elevational stabilizer fin 22. The elevational rudder 30 has a trailing indent 32 which grips around the fin 22, at least over a portion of the profile depth of that fin 22.

As far as the general arrangement is concerned, elevator 30 is, at least to a major portion, situated beyond the propeller circle D and extends particularly laterally i.e. in horizontal direction beyond that circle D. The balanced rudder arrangement for the elevator and the construction of the elevator control generally as a T shaped configuration permits the elevator 30 to have a disposition that even in the case of an up or down deflection, the propeller 5 is not interfered with.

As shown also in FIG. 2c the flow deflecting and redirecting rudders and airfoils 27 and 27' are configured and designed equivalent to high lift flaps: this is the reason for the formation of this gap 35 which on the other hand is closed as was stated earlier by means of the flap 36 acting as far as the profile is concerned on the underside of the respective air foil 27 or 27'. The gap 35 is closed here on account of a resilient effect exerted by the flap 36 against the air foil element. In case of a large deflection angle of the respective airfoil or rudder 27, 27' the gap 35 will be opened on account of the flow into the gap forcing the resiliently biased flap 36 to automatically open the gap 35.

The helicopter as described operates as follows. For forward motion and cruising as well as for compensating the moment produced by the principal rotor, the propeller 5 cooperates with the two lateral rudder and flow deflecting elements 27 and 27'. They cooperate in such an advantageous manner that the thrust vector can very quickly be changed and redirected whenever the airfoils 27 and 27' are pivoted in one direction or the other.

During hovering the moment compensation is carried out exclusively by deflecting the rudder elements 27 and 27'. On the other hand during regular cruising almost the entire power produced by the plant 11 is fed to and runs the propeller 5. Any residual moment that is needed to offset the moment produced by the rotor 2 is also established here by deflection of rudders 27 and 27'. On the other hand any residual forward thrust that occurs during hovering and resulting from the fact that flow deflection is slightly less than 90 degrees can be compensated by a slight tilt of the axis of rotor 2 as shown specifically in FIG. 3.

Generally speaking rotor 2 provides for the principal lift of the craft throughout and for this reason it has a more positive adjustment to begin with and as compared with conventional helicopters. Finally, it should be mentioned that the forward thrust production during cruising in conjunction with the propeller 5 and under cooperation with the rudders 27 and 27' is such that the craft can be accelerated strongly and also be decelerated strongly with practically no pitch.

The invention is not limited to the embodiments described above but all changes and modifications thereof, not constituting departures from the spirit and scope of the invention, are intended to be included.

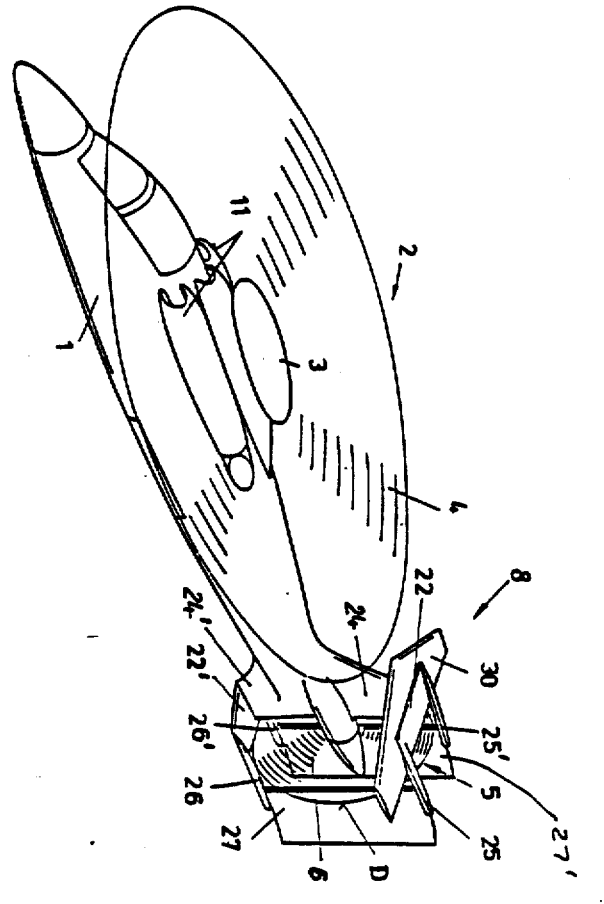

I claim:

1. In a helicopter type craft having a tiltable, vertical thrust and lift producing rotor, a separate forward thrust producing propeller as well as means for yaw control and compensation, the improvement comprising:
    said propeller being constructed as unshrouded propulsion device;
    a pair of flow deflecting rudders arranged downstream from said propeller and symmetrically to both sides of a vertical plane through a longitudinal axis of the craft; and
    a frame on the tail portion of the craft and including vertical shafts for pivotally mounting said rudders, said frame including support structure for regular elevational, horizontally extending stabilizer fins and an elevator arranged upstream from said propeller.

2. The improvement as in claim 1, said support structure including vertically rearwardly extending stabilizer fins and carrier arms extending rearwardly from said horizontal stabilizer fine.

3. The improvement as in claim 2, there being a T shaped support structure of which the vertically oriented stabilizer fins constitute the stem, and horizontally extending vertical elevational stabilizer constitute cross bars, the arms extending from said elevational stabilizers.

4. The improvement as in claim 3 wherein said vertically positioned stabilizer fins as well as said horizontal elevational stabilizer fins are positioned in the rear towards the tail end of the craft so as to be outside of the down draft produced by the helicopter rotor.

5. The improvement as in claim 3 wherein an elevator is connected, as balanced elevator to one of said elevational stabilizer fins.

6. The improvement as in claim 5 wherein, as seen along the longitudinal axis of the craft, said balanced elevator extends laterally beyond a circle provided by said tail end propeller.

7. The improvement as in claim 1 wherein said flow deflecting rudders are provided with closing flaps which open automatically in case of a large angle of attack and deflection of the respective rudder.

8. The improvement as in claim 1 said elevator being disposed upstream from one of the elevational stabilizer fins.

9. The improvement as in claim 8, said elevator reaching laterally beyond and longitudinally alongside the one fin.

10. The improvement as in claim 8, said elevator extending laterally beyond a circle provided by said propeller.

* * * * *

UNITED STATES PATENT AND TRADEMARK OFFICE
CERTIFICATE OF CORRECTION

PATENT NO. : 4,726,547

DATED : February 23, 1988

INVENTOR(S) : Herbert Zimmer

It is certified that error appears in the above-identified patent and that said Letters Patent is hereby corrected as shown below:

The title page should be deleted to appear as per attached title page.

Signed and Sealed this

Fourteenth Day of February, 1989

*Attest:*

DONALD J. QUIGG

*Attesting Officer*      *Commissioner of Patents and Trademarks*

United States Patent [19]
Zimmer

[11] Patent Number: 4,726,547
[45] Date of Patent: Feb. 23, 1988

[54] HELICOPTER WITH HIGH FORWARD SPEED

[75] Inventor: Herbert Zimmer, Friedrichshafen, Fed. Rep. of Germany

[73] Assignee: Dornier GmbH, Friesrichshafen, Fed. Rep. of Germany

[21] Appl. No.: 927,660

[22] Filed: Nov. 5, 1986

[30] Foreign Application Priority Data

Nov. 6, 1985 [DE] Fed. Rep. of Germany ...... 3539338

[51] Int. Cl.⁴ .......................... B64C 27/82; B64C 5/02
[52] U.S. Cl. ........................... 244/17.11; 244/6; 244/51; 244/87; 244/17.19; D 12/327; D 12/338
[58] Field of Search ............ 244/17.11, 17.19, 17.21, 244/6, 51, 7 R, 7 A, 7 B, 87; D 12/327, 338, 337; 440/37

[56] References Cited

U.S. PATENT DOCUMENTS

| | | | |
|---|---|---|---|
| D. 194,892 | 3/1963 | Harned et al. | D 12/327 |
| D. 238,483 | 1/1976 | Swanson | D 12/338 |
| 1,609,978 | 12/1926 | Wagner | 244/87 |
| 2,081,957 | 6/1937 | Roche | 244/87 |
| 2,547,255 | 4/1951 | Bruel | 244/17.19 |
| 3,029,048 | 4/1962 | Brooks et al. | 244/17.19 |
| 3,260,482 | 7/1966 | Stroukoff | 244/17.19 |
| 3,409,248 | 11/1968 | Bryan | 244/6 |
| 3,417,946 | 12/1968 | Hartley | 244/87 |
| 3,921,942 | 11/1975 | Bracke | 244/87 |
| 4,421,489 | 12/1983 | Veldhuizen | 440/37 |

FOREIGN PATENT DOCUMENTS

| | | | |
|---|---|---|---|
| 56121 | 9/1952 | France | 244/87 |
| 1178374 | 5/1959 | France | 244/51 |

Primary Examiner—Galen Barefoot
Attorney, Agent, or Firm—Ralf H. Siegemund

[57] ABSTRACT

A helicopter having the usual tiltable, vertical thrust and lift producing rotor, a separate forward thrust producing propeller as well as provisions for yaw control and compensation is improved in that the propeller is constructed as unshrouded propulsion device. A pair of flow deflecting rudders is arranged downstream from the propeller and symmetrically to both sides of the craft; a frame on the tail portion of the craft includes vertical shafts for pivotally mounting the rudders. A T shaped support structure in the frame includes regular elevational, horizontally extending stabilizer fins and carrier arms. An elevator is arranged upstream from the propeller and from one of the elevational stabilizer fins. The elevator reaches laterally beyond and longitudinally alongside the one fin or beyond a circle provided by the propeller.

10 Claims, 6 Drawing Figures